(12) United States Patent
Kano

(10) Patent No.: US 10,587,838 B2
(45) Date of Patent: Mar. 10, 2020

(54) IMAGE PROCESSING APPARATUS CAPABLE OF ACQUIRING POSITION INFORMATION, CONTROL METHOD FOR THE IMAGE PROCESSING APPARATUS, AND RECORDING MEDIUM

(71) Applicant: CANON KABUSHIKI KAISHA, Tokyo (JP)

(72) Inventor: Shinji Kano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/857,233

(22) Filed: Dec. 28, 2017

(65) Prior Publication Data

US 2018/0191994 A1 Jul. 5, 2018

(30) Foreign Application Priority Data

Jan. 5, 2017 (JP) ................................. 2017-000473

(51) Int. Cl.
| | |
|---|---|
| *H04N 5/77* | (2006.01) |
| *H04N 5/92* | (2006.01) |
| *H04N 5/232* | (2006.01) |
| *G01S 19/48* | (2010.01) |
| *G11B 27/34* | (2006.01) |
| *G11B 27/031* | (2006.01) |
| *H04N 9/82* | (2006.01) |
| *H04N 1/00* | (2006.01) |
| *H04N 9/80* | (2006.01) |

(52) U.S. Cl.
CPC ........... *H04N 5/9201* (2013.01); *G01S 19/48* (2013.01); *G11B 27/031* (2013.01); *G11B 27/34* (2013.01); *H04N 1/00* (2013.01); *H04N 5/232* (2013.01); *H04N 5/23245* (2013.01); *H04N 5/772* (2013.01); *H04N 9/8205* (2013.01)

(58) Field of Classification Search
USPC ......................................... 386/227, 334, 248
See application file for complete search history.

(56) References Cited

U.S. PATENT DOCUMENTS

| | | | |
|---|---|---|---|
| 7,784,077 B2* | 8/2010 | Fernandez ........... | G11B 27/034 725/86 |
| 2008/0098316 A1* | 4/2008 | Declan ................... | G06F 16/58 715/764 |

(Continued)

FOREIGN PATENT DOCUMENTS

JP 2007-166056 A 6/2007

*Primary Examiner* — Nigar Chowdhury
(74) *Attorney, Agent, or Firm* — Canon U.S.A., Inc. IP Division

(57) ABSTRACT

An image processing apparatus includes a generation unit configured to generate moving image data containing a plurality of frames, an acquisition unit configured to acquire position information, an association unit configured to associate the position information acquired by the acquisition unit with a corresponding frame in the plurality of frames in the moving image data generated by the generation unit, and a reception unit configured to receive an instruction for switching a setting as to whether a function of acquiring the position information by the acquisition unit is made to be enabled or disabled. The association unit associates information based on whether the function of acquiring the position information is enabled with the plurality of frames.

15 Claims, 5 Drawing Sheets

(56) References Cited

U.S. PATENT DOCUMENTS

| | | | |
|---|---|---|---|
| 2009/0189811 A1* | 7/2009 | Tysowski | G01S 19/14 |
| | | | 342/357.34 |
| 2010/0086276 A1* | 4/2010 | Sproule | G11B 27/034 |
| | | | 386/278 |
| 2010/0131533 A1* | 5/2010 | Ortiz | G06F 16/58 |
| | | | 707/758 |
| 2011/0033113 A1* | 2/2011 | Sakaguchi | G06F 16/70 |
| | | | 382/190 |
| 2011/0157227 A1* | 6/2011 | Ptucha | H04N 5/232 |
| | | | 345/638 |
| 2013/0321647 A1* | 12/2013 | Khawand | H04N 5/222 |
| | | | 348/207.1 |
| 2014/0028827 A1* | 1/2014 | Piccionielli | G06Q 30/02 |
| | | | 348/78 |
| 2014/0279294 A1* | 9/2014 | Field-Darragh | G06Q 10/087 |
| | | | 705/28 |
| 2014/0343984 A1* | 11/2014 | Shahabi | G06Q 10/06311 |
| | | | 705/7.13 |
| 2016/0026866 A1* | 1/2016 | Sundaresan | G06K 9/00671 |
| | | | 705/26.7 |
| 2017/0024682 A1* | 1/2017 | Piccionelli | H04N 7/141 |
| 2018/0152494 A1* | 5/2018 | Wilson | H04L 65/602 |
| 2018/0205906 A1* | 7/2018 | Boyle | G11B 27/031 |

* cited by examiner

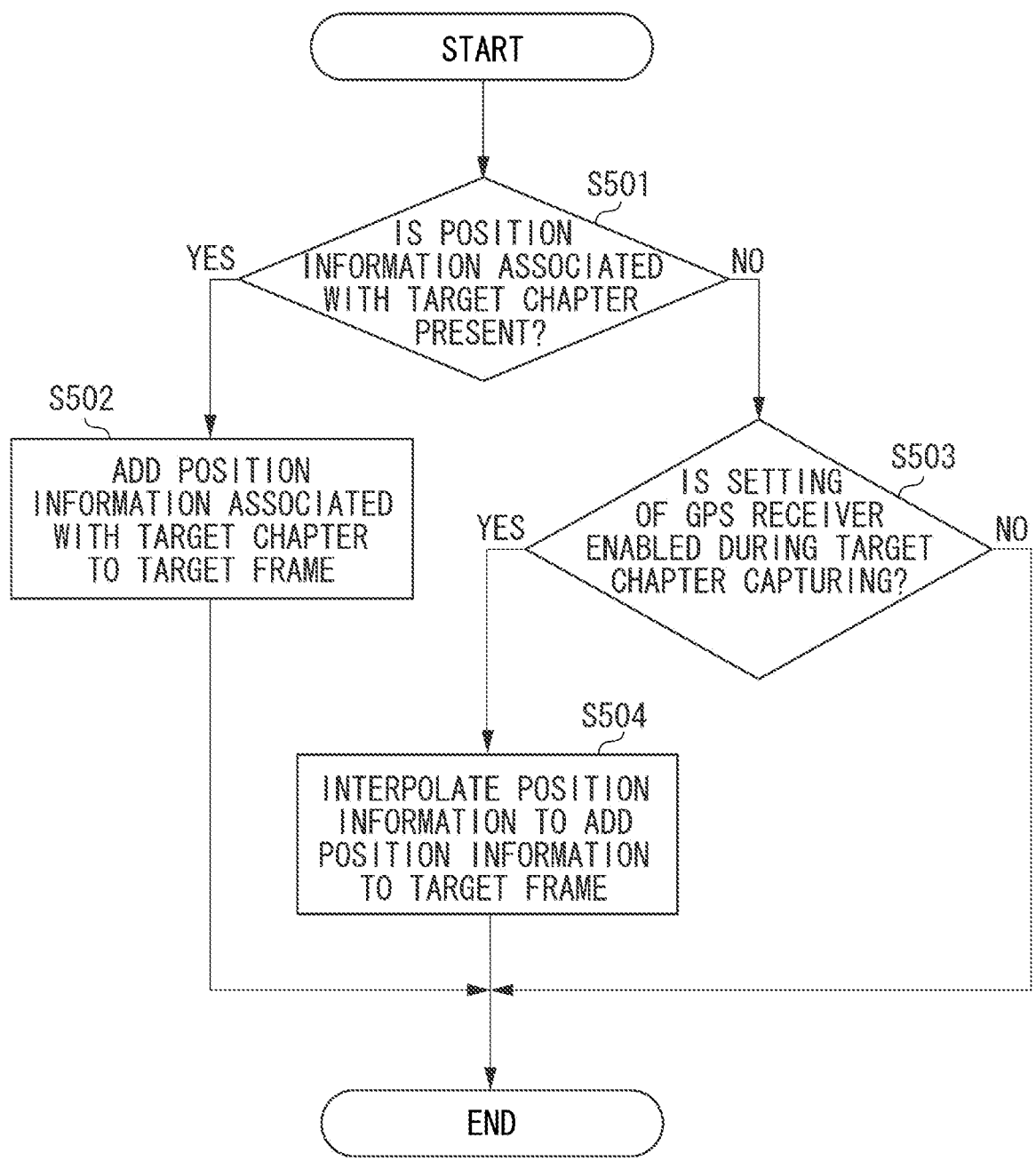

IMAGE PROCESSING APPARATUS CAPABLE OF ACQUIRING POSITION INFORMATION, CONTROL METHOD FOR THE IMAGE PROCESSING APPARATUS, AND RECORDING MEDIUM

BACKGROUND OF THE INVENTION

Field of the Invention

The present disclosure relates to an image processing apparatus capable of acquiring position information, a control method for the image processing apparatus, and a recording medium.

Description of the Related Art

Conventionally, a technique for adding position information acquired by a global positioning system (GPS) to a moving image has been known. Further, in a case where a frame is cut out from a moving image, if position information associated with the frame cannot be acquired, position information is interpolated to be added to the frame. There exists a technique that performs such interpolation. Japanese Patent Application Laid-Open No. 2007-166056 discusses a technique for, in a case where position information associated with a frame of a moving image cannot be acquired, interpolating position information based on position information associated with frames acquired before and after such a frame that associated position information cannot be acquired.

In the conventional technique, in the case where a frame is cut out from a moving image, position information is always added to the frame. That is to say, in the conventional technique, position information is added also to a frame to which position information has not been added by turning off a GPS intentionally by a user. In such a case, in the conventional technique, control for adding position information is not sufficiently based on a user's intention.

SUMMARY OF THE INVENTION

An image processing apparatus includes a generation unit configured to generate moving image data containing a plurality of frames, an acquisition unit configured to acquire position information, an association unit configured to associate the position information acquired by the acquisition unit with a corresponding frame in the plurality of frames in the moving image data generated by the generation unit, and a reception unit configured to receive an instruction for switching a setting as to whether a function of acquiring the position information by the acquisition unit is made to be enabled or disabled. The association unit associates information based on whether the function of acquiring the position information is enabled with the plurality of frames.

Further features of the present disclosure will become apparent from the following description of exemplary embodiments with reference to the attached drawings.

BRIEF DESCRIPTION OF THE DRAWINGS

FIG. 5 is a flowchart illustrating the control processing according to the second exemplary embodiment.

DESCRIPTION OF THE EMBODIMENTS

An exemplary embodiment of the present disclosure will be described below with reference to the drawings.

Figure 1:
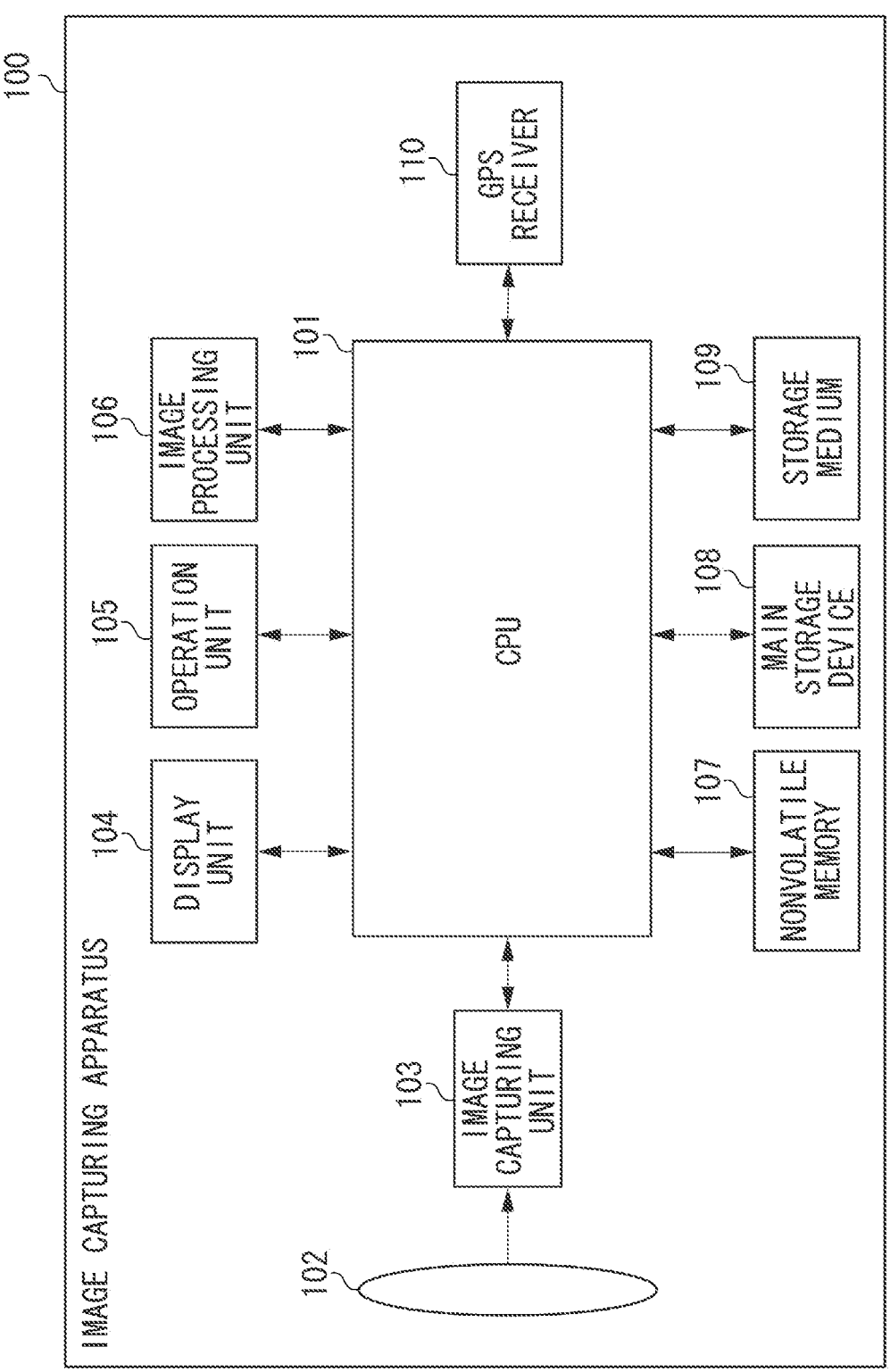
FIG. 1 is a diagram illustrating an image capturing apparatus.

FIG. 1 is a diagram illustrating an image capturing apparatus 100 according to a first exemplary embodiment. The image capturing apparatus 100 is an example of a moving image recording apparatus and is an example of an image processing apparatus. The image capturing apparatus 100 includes a central processing unit (CPU) 101, an image pickup lens 102, an image capturing unit 103, a display unit 104, an operation unit 105, an image processing unit 106, a nonvolatile memory 107, a main storage device 108, a storage medium 109, and a global positioning system (GPS) receiver 110.

The CPU 101 includes a microprocessor or the like, and executes various processing. The nonvolatile memory 107 includes a flash memory or the like. The nonvolatile memory 107 stores information, such as information set by a user, which is to be held also while power of the image capturing apparatus is off, and transmitted information which is generated every time when image data is transmitted. Further, the nonvolatile memory 107 stores also a program code for performing device control such as image capturing, and an operating system (OS). The main storage device 108 includes a random access memory (RAM) or the like, and is used to temporarily save data of the image capturing unit 103 and the image processing unit 106. The storage medium 109 includes a removable recording medium or the like, and saves captured image data. A function and processing of the image capturing apparatus 100, described below, are realized in such a manner that the CPU 101 reads out a program stored in the main storage device 108 to execute this program.

The image capturing unit 103 captures an image and a moving image. The display unit 104 displays a captured image, a moving image that is currently being captured, a user setting screen, a live view image and the like. The operation unit 105 is used in a case where an actual still image or an actual moving image is captured, or in a case where a desired setting is input through the user setting screen. The image processing unit 106 executes image processing such as image analysis of a captured image or moving image. The GPS receiver 110 receives a signal from a GPS satellite to be capable of acquiring position information about the own apparatus (the image capturing apparatus 100) and a time when the position information is acquired. The GPS receiver 110 is an example of a position information acquisition unit.

Figure 2:
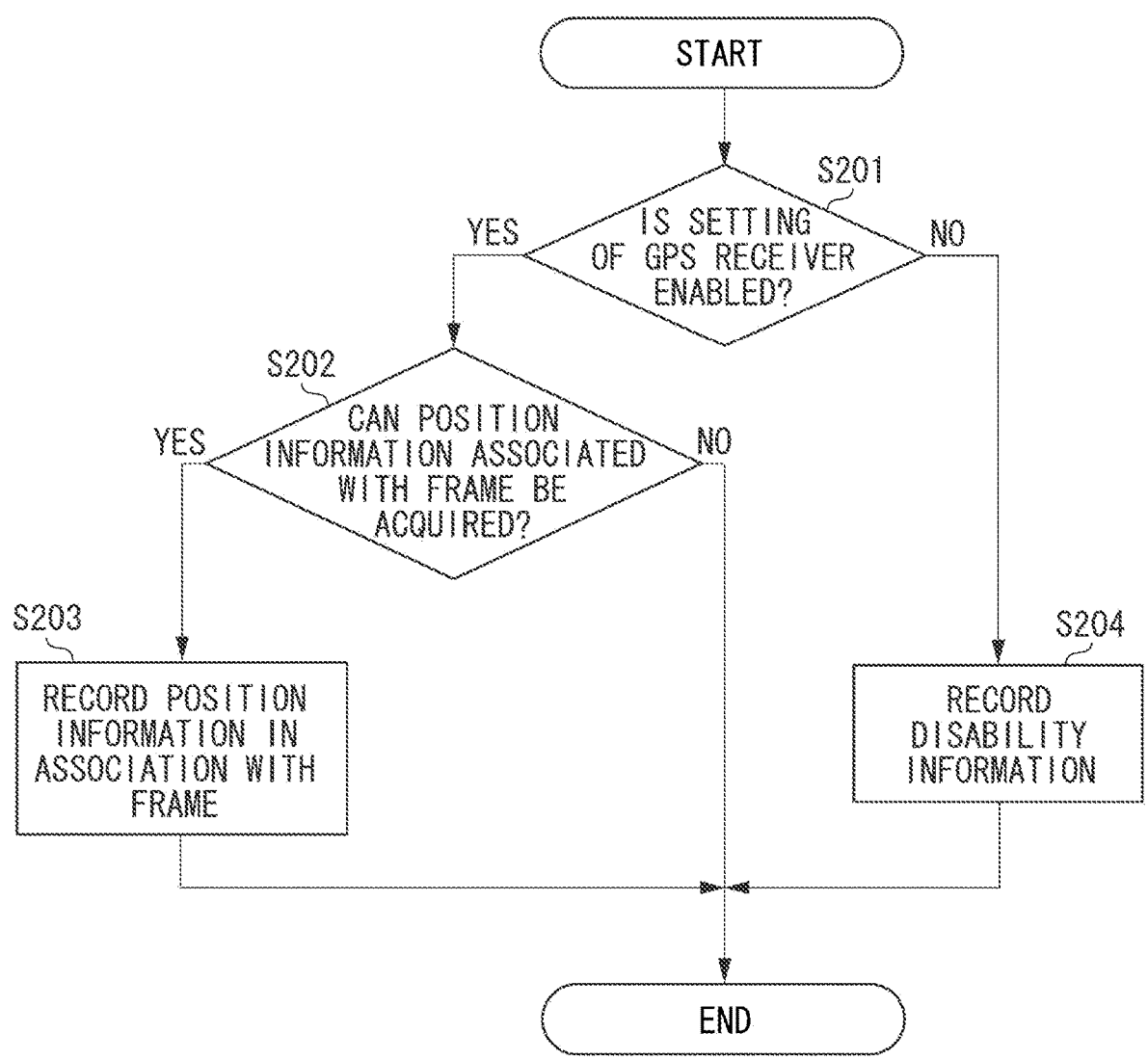
FIG. 2 is a flowchart illustrating control processing according to a first exemplary embodiment.

FIG. 2 is a flowchart illustrating control processing to be executed by the image capturing apparatus 100 at a time of moving image capturing. The control processing starts by capturing a frame of a moving image with the image capturing apparatus 100. In step S201, the CPU 101 determines whether a setting of the GPS receiver 110 at a time of frame capturing is enabled or disabled. In a case where the CPU 101 determines that the setting is enabled (Yes in step S201), the processing proceeds to step S202. In a case where the CPU 101 determines that the setting is disabled (No in step S201), the processing proceeds to step S204.

In step S202, the CPU 101 determines whether position information can be acquired from the GPS receiver 110 at the time of frame capturing. In a case where the CPU 101 can acquire the position information (Yes in step S202), the processing proceeds to step S203. In a case where the CPU 101 cannot acquire the position information (No in step S202), the processing ends. The time of frame capturing is an example of timing corresponding to the time of frame capturing, and such timing can be regarded to be approximately equal to the time of frame capturing. Therefore, the time of frame capturing does not have to entirely match with the capturing timing. In step S203, the CPU 101 records the position information at the time of frame capturing in association with the frame.

On the other hand, in step S204, the CPU 101 records disability information in association with the frame. The disability information is information representing that the setting of the GPS receiver 110 is disabled at the time of frame capturing. In the above processing, the position information is associated with a frame that is captured when the setting of the GPS receiver 110 is enabled, and the disability information is associated with a frame that is captured when the setting of the GPS receiver 110 is disabled. The processing in step S203 is an example of position recording processing for recording position information acquired at timing corresponding to the time of frame capturing so that the timing is identifiable. In the present exemplary embodiment, timing is synchronized between position information and a frame by associating the position information with the frame, but a specific method for synchronizing the timing between the frame and the position information is not limited to the exemplary embodiment. As another example, information representing synchronized timing can be added to the frame and the position information.

Further, the processing in step S204 is an example of setting recording processing for recording the information representing the setting of the GPS receiver 110 at the timing corresponding to the time of frame capturing so that the timing is identifiable. In the present exemplary embodiment, the CPU 101 adds the disability information only in a case where the setting is disabled. However, as another example, the CPU 101 can add ability information representing ability in a case where the setting is abled. Moreover, a specific method for associating a frame with the information representing the setting is not limited to the exemplary embodiment.

Figure 3:
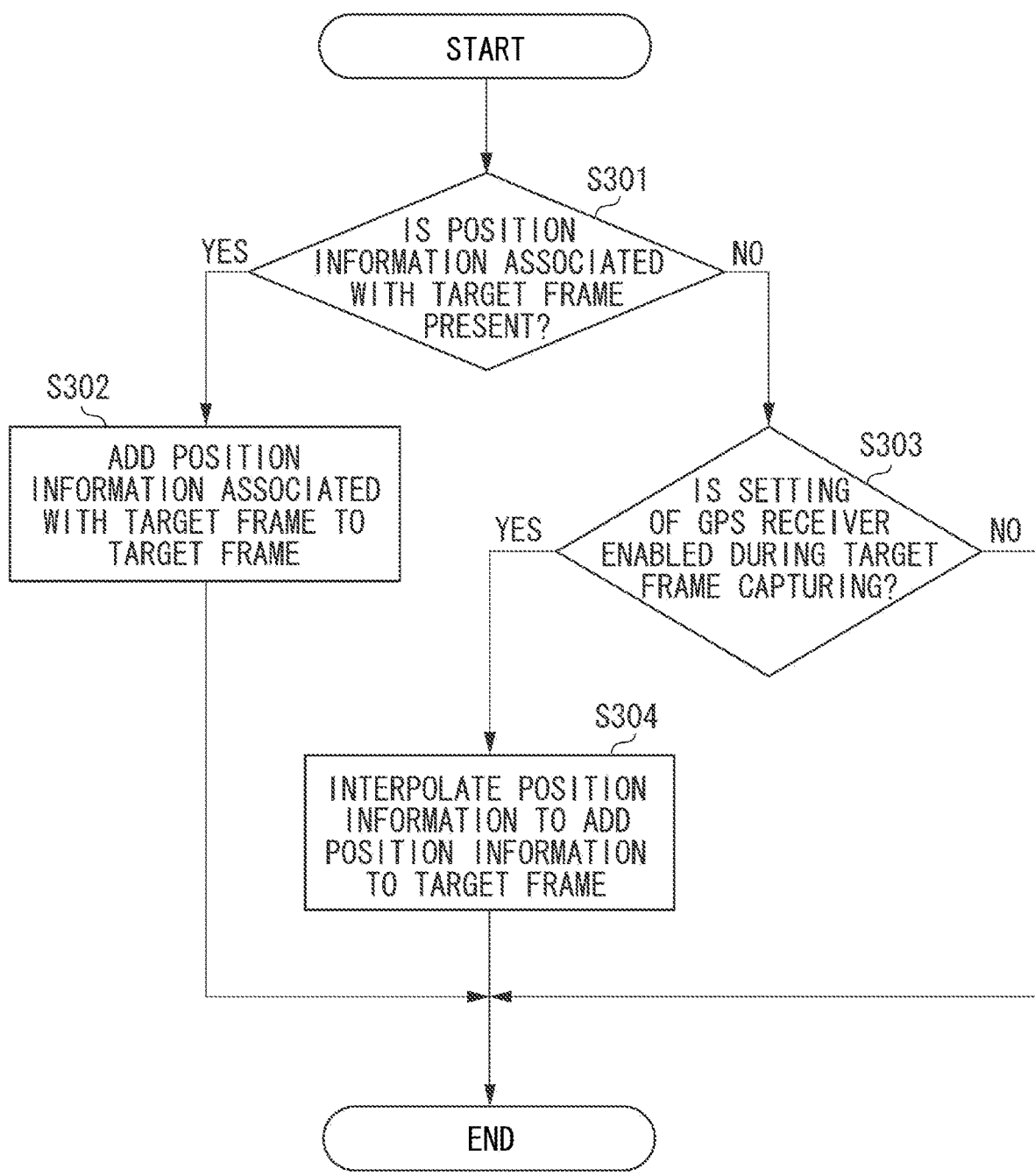
FIG. 3 is a flowchart illustrating the control processing according to the first exemplary embodiment.

FIG. 3 is a flowchart illustrating control processing to be executed in a case where the image capturing apparatus 100 cuts out a frame from a moving image. The control processing to be executed on a cut-out frame starts by cutting out a frame from a moving image with the image capturing apparatus 100. Hereinafter, a cut-out frame is referred to as a target frame. In step S301, the CPU 101 determines whether position information is recorded in association with a target frame. In a case where the CPU 101 determines that the position information is recorded (Yes in step S301), the processing proceeds to step S302. In a case where the CPU 101 determines that the position information is not recorded (No in step S301), the processing proceeds to step S303. In step S302, the CPU 101 adds the position information recorded in association with the target frame to the target frame.

In step S303, the CPU 101 determines whether the setting of the GPS receiver 110 is enabled at a time of capturing the target frame. Specifically, in a case where disability information is not recorded in association with the target frame, the CPU 101 determines that the setting of the GPS receiver 110 is enabled. Further, in a case where the disability information is recorded in association with the target frame, the CPU 101 determines that the setting of the GPS receiver 110 is disabled. That is, the CPU 101 determines, based on a recording result of information representing the setting of the GPS receiver 110, whether the setting of the GPS receiver 110 at the time of capturing the target frame is enabled or disabled. In a case where the CPU 101 determines that the setting is enabled (Yes in step S303), the processing proceeds to step S304. In a case where the CPU 101 determines that the setting is disabled (No in step S303), the processing ends. That is, in a case where the setting is determined to be disabled, the position information is not added to the target frame.

In step S304, the CPU 101 determines position information to be added to the target frame, and adds the determined position information to the target frame. The processing for determining the position information will be described herein. The CPU 101 interpolates position information associated with a plurality of predetermined frames using a relationship between recording timing of the plurality of predetermined frames and recording timing of the target frame. In such a manner, the CPU 101 determines position information to be added to the target frame. The plurality of predetermined frames is, in frames associated with position information, frames that are other than a target frame and are determined in advance based on the target frame. That is, the plurality of predetermined frames is, for example, two frames just before and after the target frame. Further, the number of the plurality of predetermined frames can be two or more, and is not particularly limited.

The CPU 101 can determine position information about the target frame based on position information about predetermined frames around the target frame, and a specific method for this is not limited to the exemplary embodiment. As another example, the CPU 101 specifies one frame at a recording time closest to a recording time of the target frame among the frames associated with the position information, and can determine the position information associated with the specified frame as the position information about the target frame.

In the above processing, the image capturing apparatus 100 can be controlled so that position information is added to a cut-out frame in a case where the setting of the GPS receiver 110 at the time of capturing is enabled, and position information is not added in a case where the setting is disabled. That is, in the case where the image capturing apparatus 100 cuts out a frame from a moving image, the image capturing apparatus 100 can suitably control whether position information is added to a frame to be cut out.

As a modified example of the first exemplary embodiment, the image capturing apparatus 100 can cut out a frame from a moving image other than a moving image captured and recorded by the own apparatus, such as a moving image recorded by another apparatus. Also in this case, in a moving image subject to the cut-out processing, the position information and the disability information are associated with respective frames at associated timing.

The image capturing apparatus 100 according to a second exemplary embodiment will be described below. The image capturing apparatus 100 according to the second exemplary embodiment executes processing on a moving image divided into chapters. As the moving image divided into chapters, a digest moving image in which moving images acquired by capturing more than once are combined will be exemplified in the present exemplary embodiment. A dividing portion at each time of capturing is inserted into the digest moving image. Hereinafter, a moving image in each divided period is referred to as a chapter.

Figure 4:
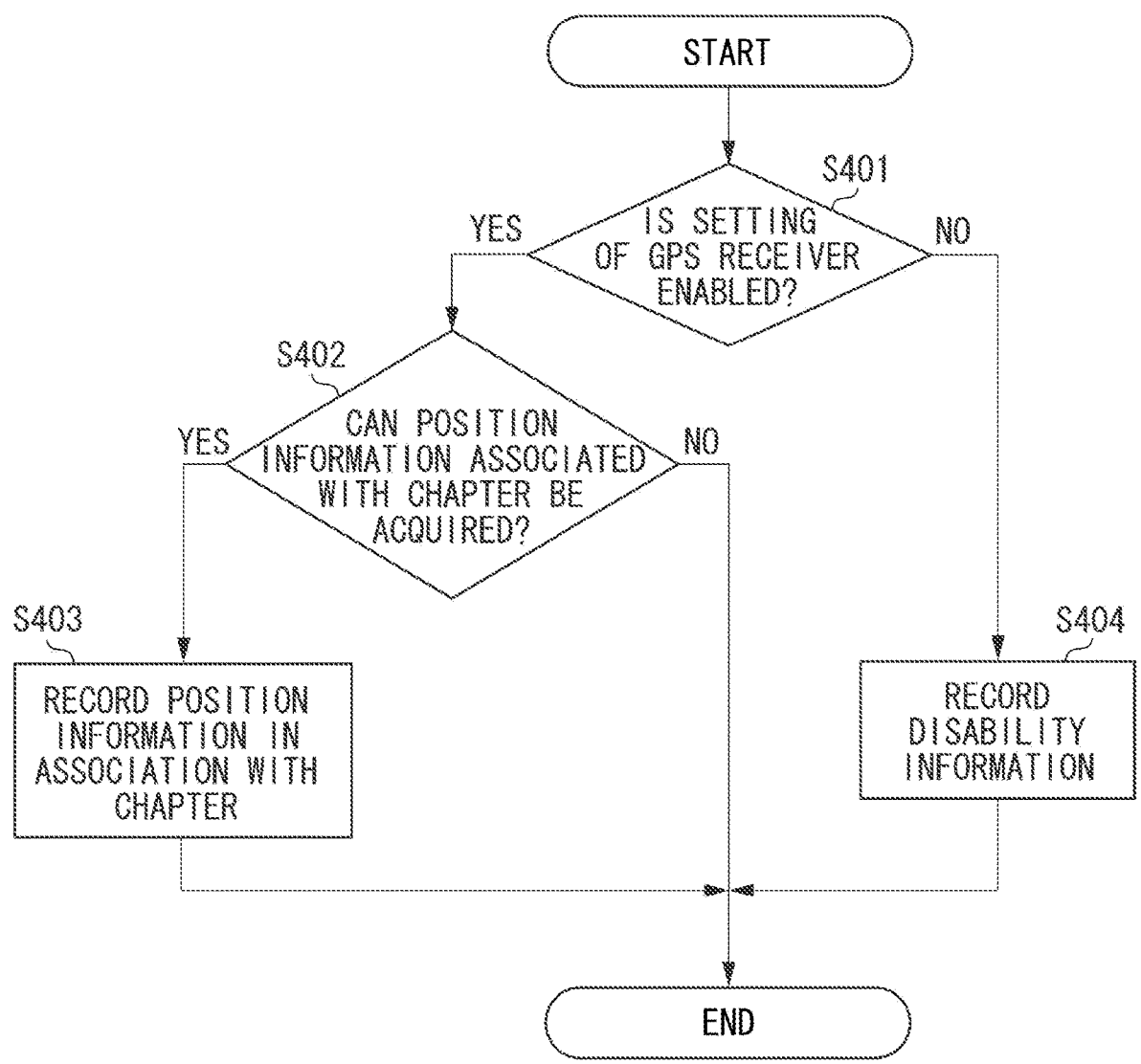
FIG. 4 is a flowchart illustrating control processing according to a second exemplary embodiment.

FIG. 4 is a flowchart illustrating control processing at a time of moving image capturing performed by the image capturing apparatus 100 according to the second exemplary embodiment. The control processing starts by capturing a frame of a moving image with the image capturing apparatus 100. In step S401, the CPU 101 determines whether the setting of the GPS receiver 110 at a time of chapter capturing is enabled or disabled. In a case where the CPU 101 determines that the setting is enabled (Yes in step S401), the processing proceeds to step S402. In a case where the CPU 101 determines that the setting is disabled (No in step S401), the processing proceeds to step S404.

In step S402, the CPU 101 determines whether position information can be acquired from the GPS receiver 110 at the time of chapter capturing. In a case where the CPU 101 can acquire the position information (Yes in step S402), the processing proceeds to step S403. In a case where the CPU 101 cannot acquire the position information (No in step S402), the processing ends. The time of chapter capturing is an example of timing corresponding to the time of chapter capturing. Timing of acquiring the position information associated with a chapter can be timing that can be regarded as the time of chapter capturing. For example, the time of chapter capturing can be timing of starting chapter recording. Further, as another example, the time of chapter capturing can be timing of capturing each frame included in a chapter.

In step S403, the CPU 101 records the position information at the time of chapter capturing in association with a chapter. Specifically, the CPU 101 records one piece of position information in association with one chapter. On the other hand, in step S404, the CPU 101 records disability information in association with a chapter. Specifically, the CPU 101 records the disability information in association with one chapter. Herein, the processing in step S403 is an example of the position recording processing for recording the position information acquired at timing corresponding to the time of chapter capturing so that the timing is identifiable. Further, the processing in step S404 is an example of the setting recording processing for recording information representing the setting of the GPS receiver 110 at the timing corresponding to the time of chapter capturing so that the timing is identifiable. As another example, the CPU 101 can add ability information in a case where the setting is enabled.

FIG. 5 is a flowchart illustrating control processing to be executed in the case where the image capturing apparatus 100 cuts out a frame from a moving image. The control processing to be executed on a cut-out frame starts by cutting out a frame from a moving image with the image capturing apparatus 100. That is, the cut-out frame is subject to the control processing. Hereinafter, a cut-out frame is referred to as a target frame. Further, a chapter including a target frame is referred to as a target chapter. In step S501, the CPU 101 determines whether position information is recorded in association with a target chapter. In a case where the CPU 101 determines that the position information is recorded (Yes in step S501), the processing proceeds to step S502. In a case where the CPU 101 determines that the position information is not recorded (No in step S501), the processing proceeds to step S503. In step S502, the CPU 101 adds the position information recorded in association with the target chapter to the target frame.

In step S503, the CPU 101 determines whether the setting of the GPS receiver 110 at a time of target chapter capturing is enabled. Specifically, in a case where disability information is not recorded in association with the target chapter, the CPU 101 determines that the setting of the GPS receiver 110 is enabled. Further, in a case where the disability information is recorded in association with the target frame, the CPU 101 determines that the setting of the GPS receiver 110 is disabled. That is, the CPU 101 determines, based on a recording result of the information representing the setting of the GPS receiver 110, whether the setting of the GPS receiver 110 at the time of target chapter capturing is enabled or disabled. In a case where the CPU 101 determines that the setting is enabled (Yes in step S503), the processing proceeds to step S504. In a case where the CPU 101 determines that the setting is disabled (No in step S503), the processing ends. That is, in a case where the setting is determined to be disabled, the position information is not added to the target frame.

In step S504, the CPU 101 determines position information to be added to the target frame and adds the determined position information to the target frame. The processing for determining the position information will be described herein. The CPU 101 interpolates position information associated with a plurality of predetermined chapters using a relationship between recording timing of the plurality of predetermined chapters and recording timing of a target chapter to determine position information about the target chapter. The CPU 101, then, determines the determined position information as position information to be added to a target frame. Herein, the plurality of predetermined chapters is, for example, in chapters associated with position information, chapters that are other than a target chapter and are determined in advance based on the target chapter. That is, the plurality of predetermined chapters is, for example, two chapters just before and after the target chapter. The number of the plurality of predetermined chapters can be two or more and is not particularly limited.

The CPU 101 can determine position information about a target frame based on position information about a predetermined chapter around a target chapter. The concrete method for this is not limited to the exemplary embodiment. As another example, the CPU 101 specifies one chapter at a recording time closest to a recording time of the target chapter among the chapters associated with the position information, and can determine position information associated with the specified chapter as the position information about the target frame. A configuration and processing in the image capturing apparatus 100 according to the second exemplary embodiment other than above described portions are similar to the configuration and the processing in the image capturing apparatus 100 according to the first exemplary embodiment.

With the above described processing, the image capturing apparatus 100 can make control on a chapter basis. Specifically, in the case where the setting of the GPS receiver 110 at the time of capturing is enabled, the image capturing apparatus 100 adds position information to a cut-out frame. In the case where the setting is disabled, the image capturing apparatus 100 does not add position information. That is, in the case where the image capturing apparatus 100 cuts out a frame from a moving image, the image capturing apparatus 100 can suitably control whether position information is added to a frame to be cut out.

The exemplary embodiments of the present disclosure have been described in detail above, but the present disclosure is not limited to the specific exemplary embodiments, and various modifications and changes can be made within the scope of the present disclosure described in claims.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-000473, filed Jan. 5, 2017, which is hereby incorporated by reference herein in its entirety.

What is claimed is:

1. An image processing apparatus comprising:
   a generation unit configured to generate moving image data containing a plurality of frames;
   an acquisition unit configured to acquire position information;
   an association unit configured to associate the position information acquired by the acquisition unit with a corresponding frame in the plurality of frames in the moving image data generated by the generation unit;
   a reception unit configured to receive an instruction for switching a setting as to whether a function of acquiring the position information by the acquisition unit is made to be enabled or disabled; and
   an interpolation unit configured to interpolate position information about a frame with which the position information is not associated,
   wherein the association unit associates, in addition to associating the position information, information based on whether the function of acquiring the position information is enabled with the plurality of frames,
   wherein the information based on whether the function of acquiring the position information is enabled includes information representing that the function of acquiring the position information is enabled and information representing that the function of acquiring the position information is disabled,
   wherein, when the frame with which the position information is not associated includes information representing that the function of acquiring the position information is disabled, the interpolation unit does not interpolate position information about the frame with which the position information is not associated,
   wherein, when some frames are cut out from the moving image data, the interpolation unit interpolates position information about a frame, which is not associated with the position information and does not include the information representing that the function of acquiring the position information is disabled, among the frames to be cut.

2. The image processing apparatus according to claim 1, wherein the corresponding frame is determined based on time information.

3. The image processing apparatus according to claim 1, wherein the association unit does not associate the information based on whether the function of acquiring the position information is enabled with the frame to be associated with the position information.

4. The image processing apparatus according to claim 1, wherein the function of acquiring the position information includes a function of receiving a signal from a global positioning system (GPS) satellite to calculate the position information.

5. The image processing apparatus according to claim 1, wherein the interpolation unit associates position information about another frame in the moving image data with a frame, which is not associated with the position information and does not include the information representing that the function of acquiring the position information is disabled, in the moving image data.

6. The image processing apparatus according to claim 1, wherein the interpolation unit associates a frame, which is not associated with the position information and does not include the information representing that the function of acquiring the position information is disabled, in the moving image data with position information about another frame in the moving image data at a recording time closest to a recording time of the frame.

7. The image processing apparatus according to claim 1, wherein the interpolation unit determines, based on position information associated with two or more frames determined with reference to a recording time of the frame which is not associated with the position information and does not include the information representing that the function of acquiring the position information is disabled, in the moving image data, position information to be associated with a frame, which is not associated with the position information and does not include the information representing that the function of acquiring the position information is disabled.

8. A control method for an image processing apparatus having a function of acquiring position information, the method comprising:
   receiving an instruction for switching a setting as to whether the function of acquiring the position information is made to be enabled or disabled;
   generating moving image data containing a plurality of frames;
   associating the position information with a corresponding frame in the plurality of frames in the moving image data;
   associating, in addition to associating the position information, information based on whether the function of acquiring the position information is enabled with the plurality of frames;
   interpolating, when the frame which is not associated with the position information does not include information representing that the function of acquiring the position information is disabled, position information about a frame which is not associated with the position information; and not interpolating, when the frame is not associated with the position information includes the information representing that the function of acquiring the position information is disabled, position information about the frame which is not associated with the position information, wherein the information based on whether the function of acquiring the position information is enabled includes information representing that the function of acquiring the position information is enabled and information representing that the function of acquiring the position information is disabled, wherein, when some frames are cut out from the moving image data, position information about a frame, which is not associated with the position information and does not include the information representing that the function of acquiring the position information is disabled, among the frames to be cut out is interpolated.

9. The control method for the image processing apparatus according to claim 8, wherein the corresponding frame is determined based on time information.

10. The control method for the image processing apparatus according to claim 8, wherein the information based on whether the function of acquiring the position information is enabled is not associated with the frame to be associated with the position information.

11. The control method for the image processing apparatus according to claim 10, wherein the function of acquiring the position information includes a function of receiving a signal from a global positioning system (GPS) satellite to calculate the position information.

12. The control method for the image processing apparatus according to claim 8, wherein position information about another frame in the moving image data is associated with a frame, which is not associated with the position information and does not include the information representing that the function of acquiring the position information is disabled, in the moving image data.

13. The control method for the image processing apparatus according to claim 8, wherein a frame, which is not associated with the position information and does not include the information representing that the function of acquiring the position information is disabled, in the moving image data is associated with position information about another frame in the moving image data at a recording time closest to a recording time of the frame.

14. The control method for the image processing apparatus according to claim 8, wherein, based on position information associated with two or more frames determined with reference to a recording time of the frame which is not associated with position information and does not include the information representing that the function of the acquiring position information is disabled, in the moving image data, position information to be associated with a frame, which is not associated with the position information and does not include the information representing that the function of acquiring the position information is disabled, is determined.

15. A non-transitory computer-readable storage medium which stores a program for causing an image processing apparatus having a function of acquiring position information to execute a method, the method comprising:

receiving an instruction for switching a setting as to whether the function of acquiring the position information is made to be enabled or disabled;

generating moving image data containing a plurality of frames;

associating the position information with a corresponding frame in the plurality of frames in the moving image data;

associating, in addition to associating the position information, information based on whether the function of acquiring the position information is enabled with the plurality of frames;

interpolating, when the frame which is not associated with the position information does not include information representing that the function of acquiring the position information is disabled, position information about a frame which is not associated with the position information; and not interpolating, when the frame which is not associated with the position information includes the information representing that the function of acquiring the position information is disabled, position information about the frame which is not associated with the position information, wherein the information based on whether the function of acquiring the position information is enabled includes information representing that the function of acquiring the position information is enabled and information representing that the function of acquiring the position information is disabled, wherein, when some frames are cut out from the moving image data, position information about a frame, which is not associated with the position information and does not include the information representing that the function of acquiring the position information is disabled, among the frames to be cut out is interpolated.

* * * * *